May 20, 1952     G. A. GRUSS     2,597,582

JET-PROPELLED ROTARY AIR FOIL AND FUEL VALVE

Filed Oct. 14, 1949

Inventor:
George A. Gruss,
by Paul A. Frank
His Attorney.

UNITED STATES PATENT OFFICE 2,597,582

JET-PROPELLED ROTARY AIRFOIL AND FUEL VALVE

George A. Gruss, Erie, Pa., assignor, by mesne assignments, to the United States of America as represented by the Secretary of the Army Application October 14, 1949, Serial No. 121,390

9 Claims. (Cl. 170—135.4)

This invention relates to helicopters and in particular to an apparatus for regulating fuel to jet units installed in blade tips of helicopters.

In jet propelled helicopters where fuel is fed through the blades to propulsion units mounted thereon, a need has arisen for a workable fuel valve which maintains uniform fuel flow to each of the jet units. Such a valve must be located at the end of the blade just before the fuel enters the jet, since the major problem to be solved by the valve is the force of centrifugal action on the fuel at the blade tips.

Centrifugal force at the tip of a helicopter wing is in the order of a maximum pressure of 1500 pounds per sq. in. This is computed on a maximum blade speed of 500 ft. per second, which is apparently the present blade tip speed limitation. An ideal valve which might be set up to compensate for this centrifugal force would be a check valve at the tip of the blade spring loaded to stay closed at a pressure up to 1500 pounds per sq. in. However, such a valve would necessitate the use of a fuel pump with operating characteristics that would produce pressures of 2500 lbs. per sq. in. or greater. The size and weight of such a pump would be impractical for a helicopter.

It is an object of this invention to provide a valve which effectively compensates for the effect of centrifugal force on fuel at the blade tips of helicopters.

It is a further object of this invention to provide a valve for the wing tip of a jet propelled helicopter that has a minimum number of operative parts.

It is a still further object of this invention to provide a valve for a wing tip of a jet propelled helicopter that is simple in operation and which may be conveniently installed in helicopter blades.

Broadly, this invention comprises a valve in which the effect of centrifugal force on a column of mercury is employed to offset the effect of centrifugal force on fuel going to the blade tips; then the amount of fuel sent to the jet units is controlled by a small fuel pump.

Further objects and advantages of this invention will become apparent and the invention will be better understood from the following description referring to the accompanying drawing and the features of novelty which characterize this invention will be pointed out with particularity in the claims annexed to and forming a part of this specification.

Figure 1:
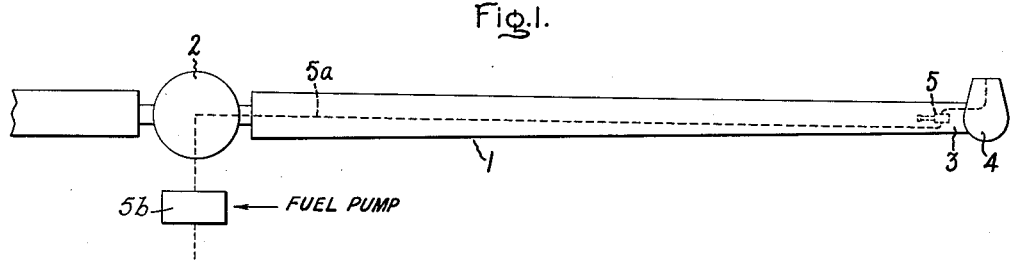
Figure 2:
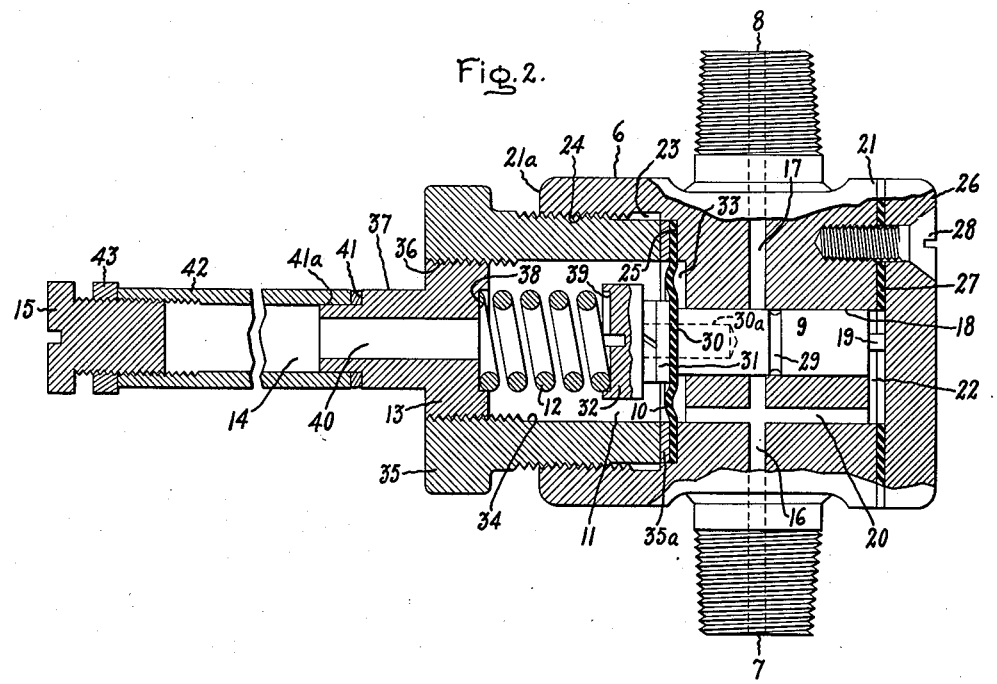

In the drawing, Fig. 1 is a schematic plan view of the central hub and a blade of a helicopter having a jet unit attached thereto; while Fig. 2 is a front elevation view, partly in section, of the improved fuel valve that supplied fuel to a jet unit in the blade of a helicopter.

Referring to the drawing, a blade or airfoil 1 of a helicopter is shown attached to a central hub 2. At the outer tip 3 of blade 1, a jet unit 4 is provided which, when operating, causes rotation of the helicopter blade. A fuel valve 5, the subject matter of this invention, is shown installed near the jet unit 4 at the blade tip 3 of the helicopter. Dotted line 5a indicates a fuel line from a fuel pump 5b in the cabin of the helicopter up through the rotatable shaft and hub 2, through blade 1, and through valve 5 to jet unit 4.

Fuel valve 5 comprises essentially body portion 6 having a fuel inlet connection 7 and a fuel outlet connection 8, piston or valve 9, gasket 10, mercury chamber 11, spring 12, adjusting nut 13 and the extension 14 of mercury chamber 11 sealed by plug 15.

Body portion 6 is a generally cylindrical section of metal provided with a pipe fitting or connection 7 for allowing fuel to pass into the body portion and it is further provided with a pipe fitting or connection 8 for conducting fuel from the body portion. A channel 16 conducts fuel from inlet fitting 7 to a cylindrical bore 18 extending axially of the body portion 6, while an outlet channel 17 conducts fuel from cylindrical bore 18 to outlet fitting 8.

Cylindrical bore 18 axially guides a cooperating piston 9 which is inserted therein. Stop 19 on piston 9 limits the extent of axial movement radially outward or towards the right, as indicated in Fig. 2. Within body portion 6, an axially directed opening 20 is provided that intersects inlet passageway 16 and permits fuel to pass from inlet passageway 16 to either end of body portion 6. End section 21 of body portion 6 is generally a flat surface provided with a duct 22 which joins axially directed opening 20 with cylindrical bore 18 allowing fuel from inlet passageway 16 to act against the face of piston 9. End 21a of body portion 6 is provided centrally with a generally cylindrical opening 23 having a threaded portion 24 and a seat 25 for positioning a neoprene gasket 10.

A plate 26 is provided as a covering for end 21 of body portion 6. Plate 26 is separated from body portion 6 by a gasket 27, and is secured to body portion 6 by a plurality of screws 28 which pass through openings in plate 26 and gasket 27 into body portion 6 in a conventional manner.

Piston 9, in cylindrical bore 18, is provided centrally with a circumferential groove 29. Groove 29, when aligned with inlet opening 16 and outlet opening 17, permits the passage of fuel through the body portion 6 from inlet 7 to outlet 8. End 30 of piston 9 includes a tapped hole 30a (indicated by dotted lines). Gasket 10 is securely held centrally against end 30 by a washer 31 and screw 32 which passes through a central hole in the gasket and engages tapped hole 30a.

While neoprene gasket 10 is shown in the drawing as a single element, it is to be understood that it involves no departure from this invention to use a gasket or diaphragm of a plurality of sections of cloth impregnated with neoprene, such as that used in automobile fuel pumps.

Gasket 10 is held against shoulder 25 in body portion 6 by means of a bushing or nut 35 and a washer 35a. Bushing 35 is in threaded engagement with threaded portion 24 in body portion 6.

Nut 35 includes a central cylindrical opening 34 having substantially the same area as a well 33 which is defined by shoulder 25 in body portion 6. Opening 34 constitutes one of the component parts of mercury chamber 11. Well 33 is connected to liquid inlet 16 by axial opening 20; consequently, liquid fuel pressure acts on one face of gasket 10. When cylindrical opening 34 is filled with mercury, the mercury operates on approximately the same area of gasket 10 as does the liquid fuel in well 33.

At its outer portion, nut 35 is provided with a threaded section 36 for engaging and regulating the axial location of a nut 37. The end of nut 37 within cylindrical opening 34 is provided with a seat 38 for coil spring 12.

The head of screw 32 that engages tapped hole 30a in piston 9 is provided with a seat 39 for the opposite end of spring 12. Tension on spring 12 is regulated by adjusting the axial location of nut 37 within nut or bushing 35.

Nut 37 is further provided with a centrally located axial cylindrical bore 40 which extends through the complete length of nut 37. A shoulder 41 and reduced portion 41a are provided on the outer end of nut 37. A tube 42, having an internal diameter equal to the external diameter of reduced portion 41a, is fitted over the end of nut 37 and rigidly secured there by some means, such as by welding. Tube 42 provides the extension 14 for mercury chamber 11 and its end is sealed by a plug 15 in threaded engagement with an internal threaded portion of tube 42. Lock nut 43 is threaded on plug 15 to lock the same in adjusted position.

In the operation of a valve of this type, it must be remembered that the centrifugal force resulting from the rotation of the blade produces a pressure on the fuel which directly affects the volume of fuel being supplied to the jet unit. If the centrifugal force is not regulated, it causes fuel to pass through the valve at an extremely high pressure. The throttling effect of the valve, however, regulates the pressure and quantity of fuel entering the jet unit. The principle of the throttling effect is such that the effect of centrifugal force on the fuel and mercury is balanced at any speed of rotation. Then a pressure supplied by a small fuel pump 5b in the cabin of the plane completely controls the position of piston 9 in the valve and, hence, the amount of fuel fed to the jet unit. Obviously, the valves on each of the blades must be identical in order to supply an equal amount of fuel to each of the jet units.

In the operation of this invention, centrifugal force of the liquid fuel acts upon one face of gasket 10 and the combined effect of the pressure of spring 12, the centrifugal force upon the mass of spring 12, piston 9, and its associated movable parts acts against the opposite face. This second force, however, is not great enough to balance the centrifugal force of the liquid fuel in the fuel line 5. Consequently, an amount of mercury is placed in chamber 11. The mass of the mercury, plus the weight of the spring, plus the weight of the movable valve parts, is calculated or experimentally determined so that the centrifugal force of these parts is equal to the centrifugal force of the liquid fuel in the fuel line. Then the force on one side of gasket 10 is equal to the force on the other side. It is to be noted that for all speeds of rotation of the helicopter blade this stable condition exists.

The force of spring 12 is primarily to maintain piston 9 in the extended position in which it is illustrated to prevent fuel from passing through the valve.

Within the cabin of the plane, between the fuel storage tanks and the rotating shaft or hub of the helicopter blade, a fuel pump 5b is provided which can develop a substantial maximum pressure, e. g. 100 lbs. per sq. in. in the liquid fuel. Fuel passes from the fuel pump through the rotating shaft of the helicopter, into the fuel line (schematically indicated by numeral 5a in Fig. 1) in each of the helicopter blades. Disregarding centrifugal force, the pressure built up by the fuel pump acts against the force of spring 12 to open the valve.

It is to be noted, however, that the force of spring 12 is the only force which must be overcome by the fuel pump to complete a passage for fuel to the jet units, since the centrifugal force of the fuel is completely counteracted.

In the application of the subject invention, the first unknown to be fixed is the location of the jet units from the center of rotation of the helicopter blades. Then valves 5 are located adjacent each of the jet units an equal distance from the center of rotation. The magnitude of the centrifugal force of the liquid fuel is then calculated for the location of the fuel valve, and the magnitude of centrifugal force of the mass of the movable parts of the fuel valve is computed. Then a calculated amount of mercury is added to mercury compartment 11 in each of the fuel valves to balance the effect of centrifugal force on the liquid fuel. If the parts of each of the valves have been carefully machined, and if the valves have been carefully positioned, then the amounts of mercury in each chamber should be equal. Under these conditions, and without considering the fuel pump, the force of spring 12 tends to keep the piston 9 of each valve in an extended or closed position at all speeds of rotation of the blades.

When the fuel pump is started within the cabin of the helicopter, a force is applied to the fuel going to valves 5, and this pressure offsets the force of spring 12, permitting fuel to pass from inlet tube 16 through groove 29 on piston 9 to outlet tube 17 and then to jet unit 5. Naturally, as the fuel pressure is increased by the pump, groove 29 is forced into closer alignment with openings 16 and 17. Maximum fuel flow exists when opening 29 is in direct alignment with openings 16 and 17.

Under the above-described condition, the regulation of fuel to the jet units can be controlled by merely regulating the speed of a small gear pump within the cabin of the helicopter. It has been found that by using a suitable spring 12, a maximum operating pressure of 100 lbs. per sq. in. at the gear pump is enough to cover the total range of speed for the helicopter blade.

Modifications of this invention will occur to those skilled in the art and it is desired to be understood, therefore, that this invention is not to be limited to the particular arrangements disclosed, but that the appended claims are means to cover all modifications which are within the spirit and scope of this invention.

In the claims, the terms "radially inward" and "radially outward" are to be interpreted with reference to the longitudinal axis of airfoil 1. Thus, for example, piston or valve 9, is radially outward with respect to chamber 11. The longitudinal axis of the fuel valve is the central longitudinal axis of body portion 6 and is parallel with the longitudinal axis of airfoil 1.

What I claim as new and desire to secure by Letters Patent of the United States is:

1. A centrifugally operable valve adapted for positioning in a rotating jet-propelled airfoil to regulate the flow of fuel to the jet thereof, said valve comprising a body portion having inlet and outlet connections interconnected by a transverse fuel passage, there being a bore intersecting said passage, valve means slidable in said bore from a first position opening said passage, to a second position closing said passage, a transverse diaphragm in said body in operative relation with said valve means, means including said diaphragm defining a sealed chamber radially inward of said valve means, and a mass of fluid in said chamber.

2. In a centrifugally-balanced valve adapted for positioning in a rotating jet-propelled airfoil radially outwardly of the axis of rotation thereof to regulate the flow of fuel to the propelling jet of the airfoil, said valve comprising, a body portion having a fuel inlet connection and a fuel outlet connection, a passage interconnecting said connections, a valve interposed in said passage and movable from a first position opening said passage to a second position closing the same, means connected with said body portion and forming a sealed chamber radially inwardly of said valve, said means including a diaphragm in operative relation with said valve to move the same to second position, and a mass of mercury in said chamber whereby to exert a radially outward force upon said diaphragm in response to rotation of said airfoil.

3. A valve as recited in claim 2, and preloaded spring means in said chamber and exerting a thrust upon said diaphragm and valve urging said valve to second position.

4. A centrifugally operable valve adapted for positioning in a rotating jet-propelled airfoil radially outward from the axis of rotation thereof to regulate the flow of fuel to the propelling jet thereof, said valve comprising a body portion having fuel inlet and outlet connections interconnected by a passage and a bore intersecting said passage, a valve slidably fitting said bore and movable from a first position cutting off said passage to a second position opening the same, means with said body portion forming a sealed chamber adjacent and radially inwardly of said valve, said means including a diaphragm, an operative connection between said valve and diaphragm, and a body of mercury in said chamber.

5. A centrifugally-balanced fuel valve adapted for positioning in a rotating jet-propelled airfoil radially outwardly of the axis of rotation thereof to regulate the flow of fuel to the propelling jet thereof, a body portion having fuel inlet and outlet connections, a passage interconnecting said connections, and a longitudinally extending bore intersecting said passage, a valve fitting said bore and slidable therein from a first radially inward position opening said passage to a second radially outward position cutting off said passage, means connected with said body portion and forming a sealed chamber, said means including a diaphragm in contact with the radially inward end of said valve, there being passageways from said inlet connection to the radially outward end of said valve and the radially outward side of said diaphragm, and a mass of mercury in said chamber.

6. The valve recited in claim 5, and a preloaded spring in said chamber exerting a force on said diaphragm to move said valve into second position.

7. The combination with an airfoil having a longitudinal axis and a rotation axis normal to said longitudinal axis, jet propulsion means carried by said airfoil remote from said rotation axis, a fuel line in said airfoil and extending from said rotation axis to said propulsion means, a valve in said fuel line adjacent said propulsion means, a sealed chamber adjacent said valve and including a diaphragm forming the radially outer wall of said chamber, a mass of liquid in said chamber, and a connection between said diaphragm and valve whereby the centrifugal force upon said valve caused by fuel in said line is balanced by the centrifugal force of said liquid.

8. In combination with an airfoil having a longitudinal axis and a rotation axis at right angles to said longitudinal axis, jet propulsion means carried by said airfoil radially remote from said rotation axis, a fuel regulating valve carried by said airfoil adjacent said propulsion means, said valve comprising a body portion having fuel inlet and outlet connections, a passage interconnecting said connections and a longitudinally-extending bore intersecting said passage, a piston valve fitting said bore and slidable therein from a first radially-inward position wherein a circumferential groove in said piston valve is in alignment with said passage, to a second radially-outward position cutting off said passage, means fixed to said body portion and forming a liquid-tight chamber radially-inwardly of said valve, said means including a diaphragm transversely of said axis, a connection between said diaphragm and valve, passageways in said body portion from said inlet connection to the radially outward side of said diaphragm and the radially-outward end of said valve, spring means urging said valve to second position, a mass of mercury in said chamber, a fuel pipe connected with said inlet connection and extending radially in and along said airfoil to said rotation axis and a fuel connection between said outlet connection and said jet propulsion means.

9. The combination recited in claim 8, said connection comprising a screw passing through said diaphragm and threaded into said piston, said spring means comprising a coil spring seated at one end in a recess in said screw and at the other end in a recess in a wall of said chamber.

GEORGE A. GRUSS.

REFERENCES CITED

The following references are of record in the file of this patent:

UNITED STATES PATENTS

| Number | Name | Date |
|---|---|---|
| 1,021,521 | Heroult | Mar. 26, 1912 |
| 1,999,697 | Kleckner et al. | Apr. 30, 1935 |
| 2,514,749 | Dobbins | July 11, 1950 |

FOREIGN PATENTS

| Number | Country | Date |
|---|---|---|
| 768,647 | France | May 22, 1934 |